Oct. 7, 1941.  E. E. HANS  2,258,324
HEATER
Filed Oct. 26, 1936  4 Sheets-Sheet 1
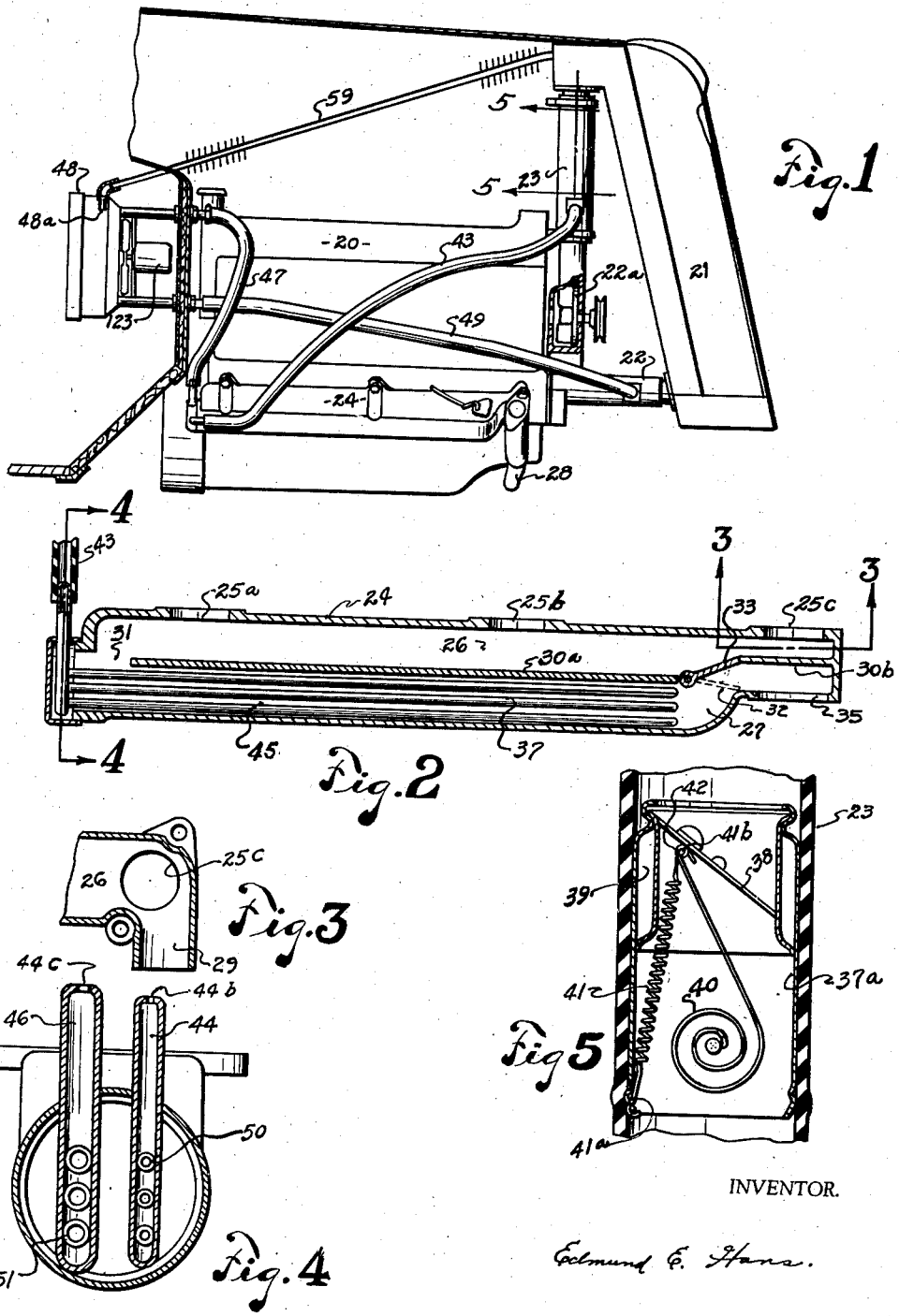
INVENTOR.
Edmund E. Hans.

Oct. 7, 1941.  E. E. HANS  2,258,324
HEATER
Filed Oct. 26, 1936  4 Sheets-Sheet 2

INVENTOR
Edmund E. Hans.

INVENTOR
Edmund E. Hans.

Oct. 7, 1941.                E. E. HANS                2,258,324
                              HEATER
                        Filed Oct. 26, 1936          4 Sheets-Sheet 4
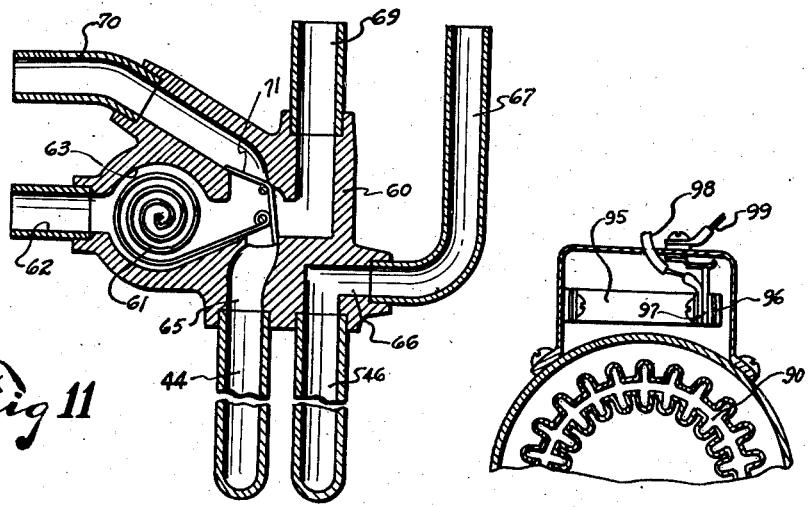
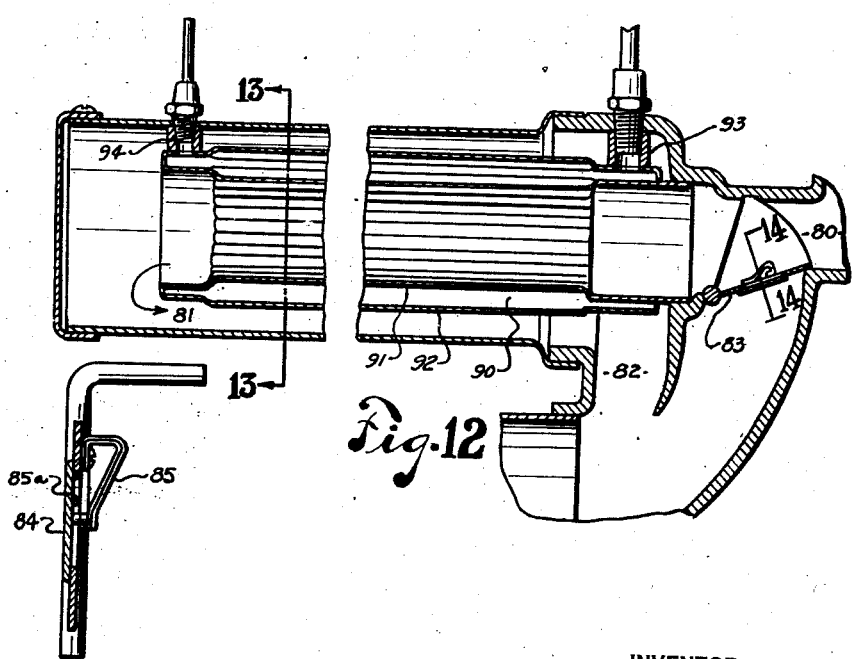
INVENTOR
Edmund E. Hans.

Patented Oct. 7, 1941

2,258,324

UNITED STATES PATENT OFFICE 2,258,324

HEATER

Edmund E. Hans, Detroit, Mich.

Application October 26, 1936, Serial No. 107,517

4 Claims. (Cl. 257—241)

This invention relates to heaters and particularly to heaters of the type used in the modern automobile for heating the passenger compartment of the same. More specifically, the invention relates to heaters of the type that use the exhaust gas of internal combustion engine to heat a fluid which circulates and transfers the heat provided by the exhaust gas to the passenger compartment of an automobile.

Another object is to provide a new and improved heater that automatically eliminates air locks within said heater to assure positive circulation at moderate driving speed.

A further object is to provide a heater for an automobile wherein auxiliary means are used to heat a portion of the cooling fluid of the engine. The auxiliary means being of such construction to assure the maximum heat being transferred to the driving compartment.

Another object is to provide an auxiliary means to heat a fluid within the heating system, said auxiliary means consisting of two compartments, one of which collects the exhaust of the engine, and the other contains a plurality of coils for the fluid. The above auxiliary means being insulated so that no heat is lost to the outside air in cold weather and insulated coil compartment when heat is closed to said compartment.

A further object is to provide a way of creating pressure to help force the fluid through the heating system.

Another object is to provide a new and improved valve which allows the ingress and egress of the heat from the exhaust manifold into the chamber containing the heating coils. Said valve having automatic control which allows a portion of the exhaust to by-pass to the manifold when the chamber containing the heating coils reaches an extremely high temperature.

Another object is to provide an exhaust heating chamber close to the main manifold passage, but of a sufficient distance away from said main exhaust passage to prevent melting or burning of heating coils at high speed driving, should said coil be without cooling liquid.

Another object is to prevent high temperature super-heated steam.

A further object is to provide a closed heating system without using cooling liquid in motor, but a separate reserve tank which supplies heating liquid for heating coils.

Another object is to provide insulated exhaust manifold and heating coil compartment to generate the greatest amount of heat in and around heating coils.

A further object is to provide auxiliary circulating pump for independent heating system as described.

Another object is to provide corrugated heating chamber with small fluid space to generate heat quickly.

A still further object is to provide a heating system that is self-contained at cold temperatures wherein the fluid will circulate from the chamber containing the heating coils to a radiator in the driving compartment and then back to the heating chamber. This cycle repeating itself until the fluid reaches a temperature high enough to control an automatic valve that opens various conduits, while closing others to allow the fluid to flow from the heating chamber to the radiator in the driving compartment to an inlet of the cooling system in the engine, then through said engine and back to the heating chamber. This novel control of the fluid provides a semi-closed system of heating wherein a comparatively small amount of fluid is heated at the start to assure a quicker heat supply and after reaching a high temperature, the conventional system using a portion of the cooling fluid from the engine is utilized to prevent high pressures within the heating system.

Another object is to provide a means of signalling the operator whenever the heating system reaches an excessive high temperature or danger point.

A still further object is to provide a means of assuring positive circulation of the fluid within the heating system by regulating the size of the various conduits carrying the fluid, in and out of the heating system, so that at high speeds or excessive heat the heating coil will create a back pressure, vapor, or low temperature steam, and retard circulation of cooling fluid preventing very high superheated steam.

A further object is to provide a means for completely cutting off the heat from the main manifold, and the auxiliary heating chamber, by insulating the intense heat from the main manifold, so that when a valve is closed no heat can penetrate between the two heating cylinders, and the liquid in the heating coils will not be affected by the heat in the main manifold when heat control valve is closed.

The above and other objects will appear more fully from the following more detailed description and by reference to the accompanying drawings wherein:

Fig. 1 is an assembly drawing illustrating an installation of my invention.

Fig. 2 is a central sectional view of the heating chamber.

Fig. 3 is a section taken on line 3—3 of Fig. 2.

Fig. 4 is a section taken on line 4—4 of Fig. 2.

Fig. 5 is a section taken on line 5—5 of Fig. 1.

Fig. 11 is a section taken substantially on line 11—11 of Fig. 7.

Fig. 12 is a central sectional view of an optional heating chamber.

Fig. 13 is a fragmentary vertical section through a heating chamber illustrating a warning control for a signal on a dash in a driving compartment, as shown on section Fig. 12.

Fig. 14 is a section taken substantially on line 14—14 of Fig. 12 the housing being omitted to better illustrate the valve construction.

Figure 6:
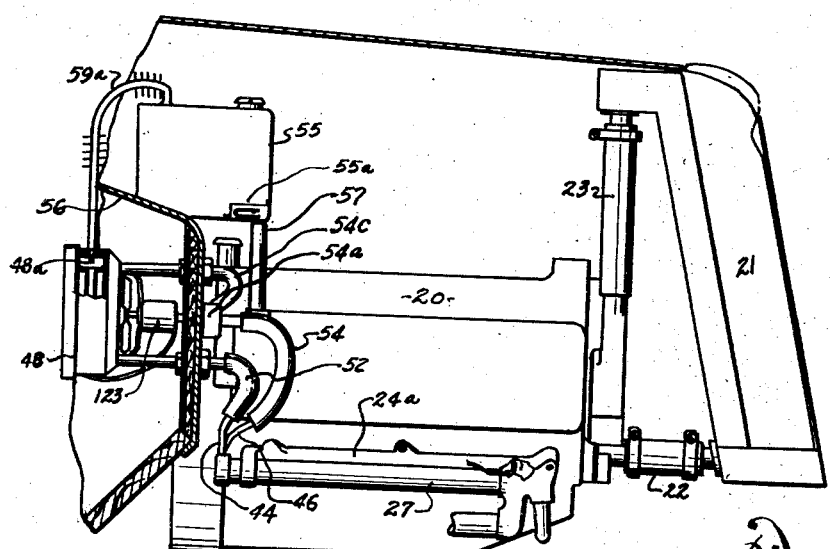
Fig. 6 is an assembly drawing showing an optional installation of my invention.

Referring now to the drawings reference character 20 indicates an internal combustion engine of the V-type which has a conventional radiator 21 with a hose 22 at the bottom thereof, said hose 22 being the inlet to the engine 20, a pump 22a is interposed between the motor block 20 and hose 23. A hose 23 connects the top of the radiator with the engine 20 so that the cooling fluid of the engine may circulate from the engine 20 through the hose 23 down the radiator 21 and back to the engine through the conduit 22 in the conventional manner. The engine 20 is also provided with an exhaust manifold 24, which is divided into two compartments by a wall 30a, said compartments having reference characters 26 and 27. Compartment 26 has a plurality of ports 25a, 25b, and 25c aligned adjacent to exhaust ports of the engine 20. The exhaust ports are not shown in the drawings. As exhaust pipe 28 connects the manifold 24 with the exhaust outlet from the other bank of cylinders so that all the exhaust empties into the compartment 26. An opening 31, at one end of the wall 30a, allows the exhaust to pass into and through the compartment 27 and out the opening 35, said opening aligns with a suitable exhaust pipe leading to the muffler of the engine.

The compartments 26 and 27 are reduced in area at the high extremity, and are separated by a wall 30b. The wall 30b extends inwardly toward wall 30a. Inserted between walls 30a and 30b is a valve 33 which regulates the flow of the exhaust. When the valve is in the position as shown, the exhaust from the engine 20 comes through ports 25a, 25b, and 25c, and 29, accumulating in compartment 26, and then passes through the opening 31 into compartment 27, and out of port 35 to a muffler. When the valve 33 is placed in the position shown in the dotted lines 32, the exhaust will then flow into compartment 26 directly out to the opening 35.

Referring to Fig. 5, the hose 23, which as hereinbefore stated, connects the outlet of the cooling fluid from the engine 20 to the inlet of the radiator 21, has a thermostat 37a, assembled therein. The thermostat 37a consists of a conventional flapper valve 38 rotatably mounted within a sleeve housing 39 said housing being snugly fitted within the hose 23. The valve 38 is operated by a bimetal coil thermostat 40. The thermostat assembly as described, is of the conventional type used in modern automobiles. The purpose is to prevent the circulation of water within the engine 20 so that higher engine temperature may be obtained in the quickest time thereby increasing the efficiency of the engine at cold temperatures. In actual production it is not necessary to make the thermostat very accurate, that is it can open between 145 degrees F. to 160 degrees F. The tendency is to have the thermostat open at around 160 degrees F. or thereabouts when new so that when the thermostat bimetallic strip 40 deteriorates and weakens, the valve 38 will still open within the correct limits of temperature. When operating, however, as a unit of the heating system, the applicant has found it desirable, through much experimentation, that the valve 38 should open at around 145 degrees F. and has added a coil spring 41 which is inserted between the valve 38 at the bottom flange portion of the housing 39, the spring 41 being mounted to the valve 38 at point 42. In order to make an adjustment, the spring 41 is pulled through opening 41a, an opening in the flange portion of the housing 39 until enough tension is provided to hold the valve 38 in position so that it will not open before reaching the definite temperature. As hereinbefore mentioned, the thermostat 37a, prevents circulation of fluid in the engine 20 when said engine is below the temperature set for valve 38 to open. While the engine is running, the cooling fluid therein is heated and expands, thereby causing a pressure against valve 38 of the thermostat 37a. A conventional water pump 22a, is usually situated within the cooling system of the engine and driven from a crankshaft by suitable belts. The operation of this pump helps to add to the pressure actuating against the valve 38.

Experience has disclosed that at idling speed, and driving up to 30 miles per hour, hardly any pressure is created by said pump. However by proper regulation or adjustment of thermostat spring 41, a pressure below valve 38 occurs which is caused by the engine heating the cooling fluid which assists in circulating the cooling fluid through coil 45, inlet 44, and outlet 46 to radiator 48. At speeds above 30 miles per hour, a pressure below valve 38 is greatly increased.

In order to secure proper circulation in cold weather, thermostat 38 should be adjusted to begin opening at approximately 145 degrees to 150 degrees F. The method here described is that of a Ford V–8 engine model 1933 to 1936. This being a V type motor with a semi-thermo siphon cooling system assisted by an agitating pump which may help slightly in circulating the cooling liquid through the above described heating system. The described V type motor has a large body of cooling liquid and at the above temperatures the thermostatic valve 38 is slightly opened at city driving speeds. This allows a very small amount of water to pass through rubber conduit 23 thereby allowing a pressure to be built up below thermostatic valve 38. This makes possible the success of the described heating system by giving constant circulation of heating liquid. If the thermostatic valve is out of adjustment or at a lower temperature more water will pass through opening in valve 38 through hose 23 into cooling radiator. This greatly reduces a flow of cooling liquid through heating tubes 45, conduits 47 and 49 thereby reducing the heat flow through radiator 48 blown through by fan and motor 123. If valve opens at lower temperature, circulation decreases allowing water in coils to create steam causing reverse flow to rubber conduit 43 due to lack of pressure.

Spring 41 may be easily applied to the outer housing 39 at one end and secured to the pin 41b at the other end. The spring may be shortened or lengthened according to the tension desired against thermostat 40. By placing the thermostat in hot water, valve 38 may be adjusted at the proper temperature above described.

By tapping into the hose 23 below the thermostat 37a and attaching a conduit 43 to the hose 23 at one end to the inlet of the heating chamber, the cooling fluid will flow through said conduit 43 into the heating chamber because of the pressure created by the heated water in the cylinder block and a slight agitation from pump 22a against the thermostat 38.

Referring to Fig. 2 the compartment 27 can be described as a heating chamber and has a plurality of U-shaped tubes 45 situated therein. At each end of the U-shaped tubes 45 are cup-shaped tubes 44 and 46 respectively. The cup-shaped tube 44 connects on the inlet side of the tubes 45, said tubes 45 having their ends reduced to an opening somewhat smaller than the outlet as shown at 50 and 51 of Fig. 4 in the drawings. The tubes 44 and 46 have restricted openings 44b and 44c respectively which are of such size so as to allow enough fluid to pass in the heating system to obtain a maximum heat at ordinary city driving speeds. Through experimentation it has been found that at speeds ranging between 25 and 30 miles per hour a $\frac{5}{32}$ inch diameter hole is required for the opening 44b.

A hose 47 connects the outlet of the tubes 45 with the inlet of the radiator 48. The radiator 48 has a hose 49 connecting its outlet with a hose 22, said hose 22 being the inlet of the cooling system of the engine 20. Thus we have a portion of the cooling fluid from the engine by-pass through the heating system and a constant circulation assured through said heating system by a series of various sized openings which eliminate the necessity of a check valve.

Ordinarily an air release valve is placed at the top of the radiator 48 so that when the output of heat drops due to the lack of circulation because of air lock, the driver of the car may open the valve. When the pressure, caused by vapor, drops within the heating system the liquid will circulate. It is a well known fact that the circulation causes the transfer of heat from the exhaust gas to the driving compartment and it is the applicant's aim to keep such circulation constant and automatic as possible. With this in mind the applicant has eliminated the valve as in the conventional radiators and substituted a small opening 48a Figs. 1 and 6, to allow any vapor or air within the system to escape. A tube 59 is of sufficient length and size to condense the vapor before reaching the radiator 21. This prevents any loss of liquid within the entire system at higher driving speed. In this manner the applicant has assured a constant circulation within heating system and thereby assured a constant and successful operation of the heating system.

Referring to Fig. 6 I have shown a heating system that is self contained. The heat generator 24a is similar to the exhaust manifold 24 shown in Fig. 1. It differs in the fact that heating chamber 27 is contained in a tubular construction instead of a casting. A few other differences in features contained therein will be described later. The heating coil contained within the heating chamber 27 has its inlet 44 connected to the outlet of radiator 48, by means of a rubber hose 52. While the outlet tube 46 is connected with a pump 54a by means of a hose 54. The pump 54a is then connected with the inlet of the radiator 48 by hose 54c. The motor 123 is situated behind the radiator 48 and propels air through said radiator with a fan which is fastened to one end of the motor armature shaft the other end of which drives the pump 54a. A tank 55 is mounted above the heating system on the cowl 56 and is the reservoir for excess fluid within the system. The tank 55 is connected with the heating system proper by a hose 57 which is fastened at the bottom of the above mentioned tank at one end thereof while the other end terminates in the hose 54. A condenser tube 59a connects the top of radiator 48 with the top of tank 55 and functions similar to the tube 59 Fig. 1.

From the foregoing it may be understood that the fluid within the heating system circulates from the heating generator to the radiator with the cycle repeating itself. This assures a faster heat at the start but the valve 33 (Fig. 2) must be operated to control the amount of exhaust in the generator chamber 27 a little sooner to prevent vapor forming in the system. The tank 55 supplies the heating system with any fluid that may have left the heater during an indefinite period.

Figure 6A:
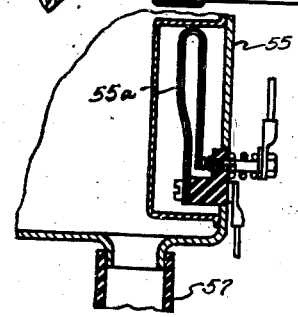
Fig. 6a is a fragmentary section of the tank illustrated in Fig. 6.

Situated within the tank 55 near the conduit 57 is a thermostat assembly 55a (Fig. 6a) which operates conventional contact points to open and close a circuit which in turn controls the operation of a signal (not shown) located on the instrument panel. Further details of this will be shown in a later application now being prepared.

Figure 7:
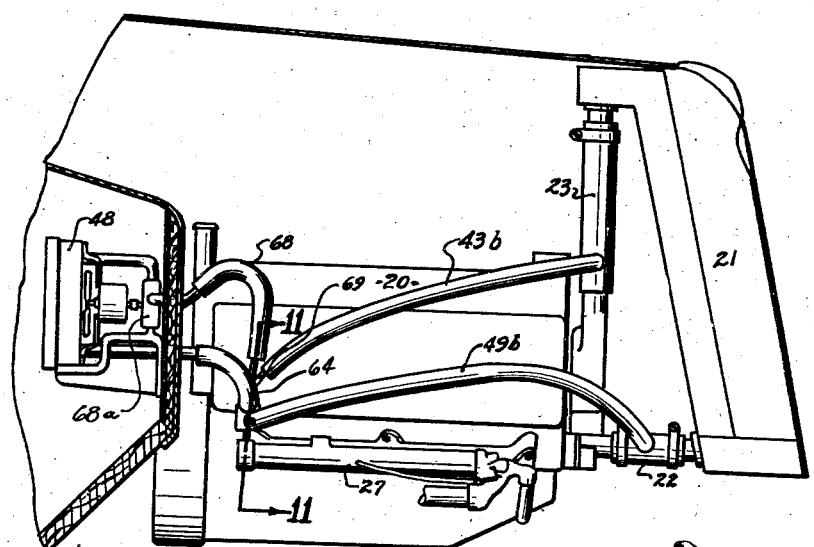
Fig. 7 is an assembly drawing showing an optional installation of my invention.

Referring to Figs. 7 and 11, I have provided an assembly that incorporates the features of both disclosures shown in Fig. 1 and Fig. 6. At cold temperatures a comparatively small amount of fluid circulates from the radiator in the driving compartment to the generator and repeats the cycle to allow the small portion of liquid to be heated over and over again. When the fluid has reached a temperature usually just below the vaporizing point a by-pass valve operates to effect a circulating of liquid similar to that shown in Fig. 1. As shown in Fig. 11, a controlling means for by-passing the fluid is provided wherein the reference character 60 indicates a housing having a recessed portion 63 adapted to receive a coiled bimetallic thermostat 61. The recess 63 is somewhat larger than the thermostat 61 and has a conduit 62 connecting said recess with the outlet of radiator 48 by means of the hose 64 (Fig. 7). At the right of, and perpendicular to, the conduit 62 and connecting with the recess 63 is a conduit 65 that aligns with the inlet 44 of the coils 45 located in the heating chamber 27. The outlet 46 of the U-shaped coils 45 aligns with a conduit 66, which is located in a corner of the housing 60 and has a tube 67 connected thereto. Said tube 67 is of such diameter to receive the hose 68.

The radiator 48 has a conventional electric motor and fan assembly mounted on a bracket in the rear thereof, said motor also drives a pump 68a which sets in the inlet hose 68 between the radiator 48 and generator 27. The radiator fan motor and pump assembly is similar to the construction disclosed in my co-pending application having the Serial No. 34,027 and filed July 31, 1935, and therefore need not be elaborated upon.

A hose 43b coming from the outlet of the engine 20 connects with a conduit 69 of the housing 60. The conduit 69 is L-shaped and connects with the recess portion 63 at right angles to the conduit 65. Likewise a hose 49b connects to the hose coupling of the engine 22 at one end and then terminates on a conduit 70 in the housing 60, said conduit also connecting with recess portion 63 directly opposite the conduit 65. A V-shaped valve 71 is interposed between the conduits 65, 69, 70 and the recess 63 in such a way that when desirable the conduits 69 and 70 can be closed so that the inlet 44 of the heating coils 45 connect directly to radiator 48 by means of the hose 64, conduit 62, recess 63 and conduits 65 so that the fluid may flow from the radiator through the above mentioned channels and then through heating coils 45 to the outlet 46 through conduits 66 and 67 into the hose 68 and the pump 68a to the radiator 48. When the fluid within the heating system has reached a high temperature the thermostat 61 operates the valve 71 so that the conduit 65 is closed from the recess 63 and is connected with the conduit 69 while at the same time the conduit 70 which connects to the cooling system of the engine, is connected directly to the recess 63. The fluid then flows from the radiator through the hose 64, conduits 62 recess 63, conduit 70, through hose 49b into the engine 20 then from the engine to the hose 43b in conduit 69 then to conduit 65 and inlet 44 to the coils 45 around said coils to the outlet 46, conduit 66, pipe 67 to the hose 68 which is the inlet to the radiator 48 which is equivalent to the flow of the fluid similar to the assembly shown in Fig. 1.

Figure 8:
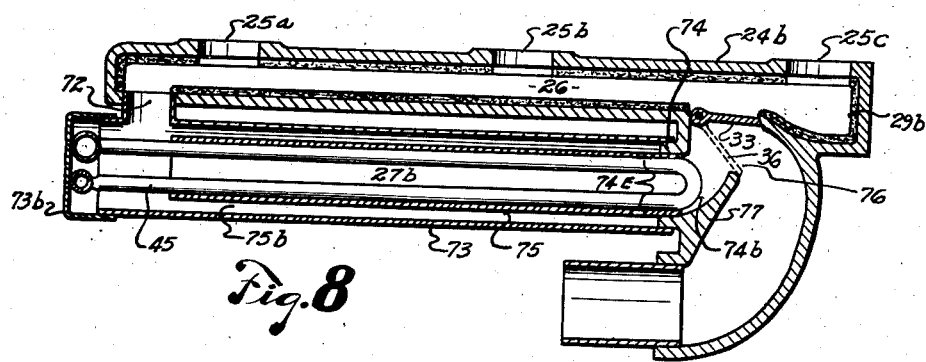
Fig. 8 is a central sectional view of an optional heating chamber.
Figure 9:
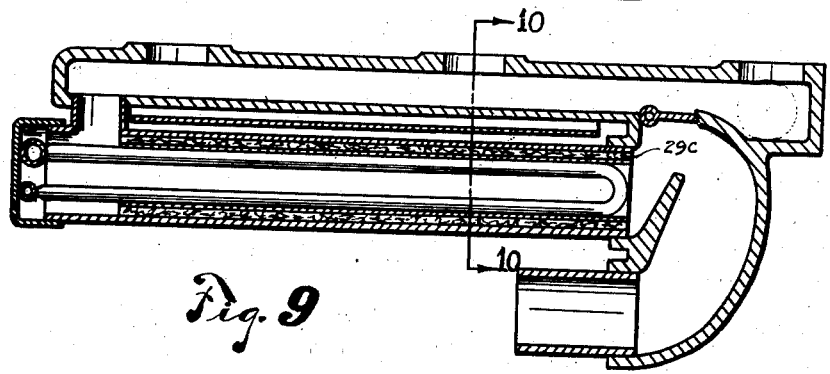
Fig. 9 is a central sectional view of an optional heating chamber.

Figs. 8 and 9 show optional constructions in the heat generating units from that disclosed in Fig. 2 and similar to the type shown in Fig. 6. Referring to Fig. 8 the generator or manifold 24b has a compartment 26 which has a plurality of openings 25a, 25b, and 25c which align with exhaust ports of the engine 20. The compartment 26 acts as a mixing chamber for all the exhaust gas so that said gas may be of uniform temperature before passing through an opening 72 which is interposed between a compartment 26 and a compartment 27b. The compartment 26 is formed by a casting 24b which also contains the valve 33 dividing said compartment 26 from an exhaust outlet 76 located at the extreme right of casting 24b. A rib 77 projects inwardly within the passage 76 and is situated in such a way so that valve 33 when abutted against the rib 77 closes the compartment 27b and opens compartment 26 so that a direct passage from the generating unit to the exhaust muffler (not shown) is effected. The heat generator as shown in Fig. 2 has two compartments, the inlet portion from the exhaust ports is open but has a partition wall 30a to protect the heating element from direct contact with the exhaust flame thereby preventing the same from melting the heating element, should the circulation stop and also causing a uniform heat on the entire heating element. It also provides regulation of the amount of heat directed against the heating element by valve 33. In this construction however (Fig. 8), heating chamber 27b consists of a large steel tube 73 which is parallel to compartment 26 and has one end which terminates around the flange 74. The flange 74 surrounds opening 74b which terminates in the exhaust passage 76. The other end of the tube 73 receives a cup-shaped cover 73b which contains the tubes 45. On the outer periphery of the tube 73 and adjacent to the cover 73b is an opening 72 connecting the compartment 26 with the inside of tube 73. A tube 75 smaller in diameter is telescoped within tube 73 and is fastened at one end to the inside of flange 74. The tube 75 is of such length so that it will reach to the edge of the opening 72. The heating coils 45 are then inserted within the tube 75. Holes 74e are provided in the tube 75 adjacent to the flange 74. These holes allow a certain amount of exhaust gas to flow through the annular conduit 75b and protect the center heating chamber 27b formed by the tube 75, from the cold outside air. The compartment 26 is insulated by suitable means usually asbestos 29b to retain as much of the exhaust heat as possible.

When the valve 33 is in the position shown in Fig. 8 the exhaust entering the compartment 26 flows through conduit 72 into the heating chamber 27b out to passage 76. When valve 33 assumes the position shown by the dotted lines 36 the exhaust gas will then flow directly to passage 76 and out to muffler by suitable means.

Figure 10:
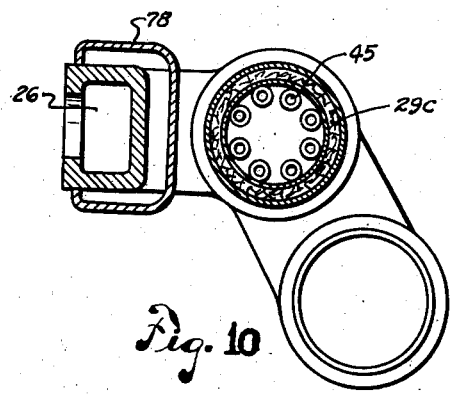
Fig. 10 is a section taken on line 10—10 of Fig. 9.

Referring to Figs. 9 and 10 a generator is shown having a similar construction as that shown in Fig. 8 with the exception of that interposed between the inner tube 75 and the outer tube 73 is an asbestos insulator 29c inserted to act as a more efficient heat retainer. A U-shaped baffle 78 is also fitted around a compartment 26, in this way the outside air is removed as much as possible from the exhaust chambers thereby retaining the maximum amount of heat in the exhaust to be transmitted to the fluid contained within the heating coil 45.

Referring to Figs. 12, 13, and 14, a type of generating unit is shown similar to that in the previous application heretofore mentioned. It differs somewhat in that the heating coils are eliminated within the generator and replaced by a fluid containing cylinder 90 which is made of two corrugated tubes 91 and 92 welded at their extremities so that a section as shown in Fig. 13 will give the heating member 90 an annular container for the fluid. In this way the exhaust gases will enter through a port 80 into said heating assembly and circulate around the inner corrugations then return as shown by the arrows 81 and circulate around the outer corrugations to passage 82 and out to the muffler. In this way the maximum heat will be taken out from the exhaust gases and transferred to the fluid contained with the heating member. The fluid carrying assembly is tapped at each end as at 93 and 94 so that the outlet is at the rear of the heating system while the inlet is at the front, so that the fluid will circulate toward the outgoing exhaust or toward the coldest part of generator.

The valve 83 is similar to that shown in the previous application heretofore mentioned with the exception that a valve 84 is inserted therein and operated by a bimetallic strip 85 so that at high speeds when the exhaust gases are exceptionally hot, the bimetallic strip will open the port 85a in the valve 83 and allow a portion of the exhaust gases to pass directly to the muffler. This is added as a safety measure in case the driver neglects to close the valve 83 at excessively high temperatures. Mounted on the outside of the heating generator is a thermostatic switch which is connected with a signal mounted on the dash (not shown) and operates when the temperature of the generator reaches an exceptionally high degree. It operates a light or signalling means to warn the occupant of the car to control the valve 83 in such a way as to further reduce the flow of the exhaust gases through the heating chamber. Further description of the light will be covered in an application following. The switch consists of a bimetallic strip 95 having contact point 96 and 97 suitably insulated. Wires 98 and 99 lead to a conventional hookup for any form of signal. Contact is broken until thermostat acts at high temperature to close contact points 96 and 97.

Figure 15:
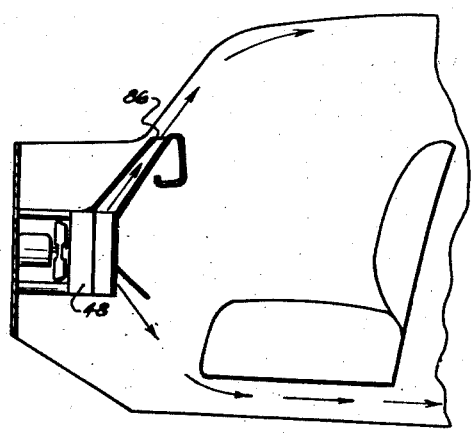
Fig. 15 is a diagrammatic view of the driving compartment showing a means of baffling the hot air to circulate within the driving compartment, a portion of which reaches the windshield and acts as a defroster.

Referring to Fig. 15, I have shown a means of distributing the hot air radiating from radiator 48 through the driving compartment; I have provided an air duct 86 coming from the top of the radiator leading to the windshield, also baffles so that a certain portion of the hot air will flow upwardly toward the windshield thereby acting as a defrosting unit, and deflect toward the rear of driving compartment while various other baffles may be arranged so that the rest of the air may be distributed throughout the driving compartment.

I claim:

1. A device of the character described comprising, a manifold casting having an elongated exhaust compartment therein and having a plurality of inlet openings extending through one wall thereof to said compartment at spaced intervals therealong, said openings being aligned with and coacting with exhaust ports in an associated engine to receive exhaust gas from said engine, said manifold also having a main outlet port at one end thereof which communicates with one end of an exhaust chamber formed in an extension which is cast integrally with said manifold, the other end of said chamber being connected to an exhaust pipe, said extension having a port formed therein intermediate of its ends, a tubular housing detachably extending between said intermediate port and a secondary outlet port in the opposite end of said manifold, an operable valve mounted in said manifold adjacent to said main outlet port which in one position closes said main outlet port and opens said intermediate port and in its other position opens said main outlet port and closes said intermediate port whereby exhaust gases from said compartment may flow directly therefrom to said exhaust pipe or may be deflected through said tubular housing before entering said exhaust pipe, a heat exchanger extending lengthwise through said tubular housing, and an inner tube extending within said housing and spaced therefrom, said inner tube being disposed around said heat exchanger and being secured to said extension member for the purpose described.

2. A device of the character described comprising, a manifold casting having an elongated exhaust compartment therein and having a plurality of inlet openings extending through one wall thereof to said compartment at spaced intervals therealong, said openings being aligned with and coacting with exhaust ports in an associated engine to receive exhaust gas from said engine, said manifold also having a main outlet port at one end thereof which communicates with one end of an exhaust chamber formed in an extension which is cast integrally with said manifold, the other end of said chamber being connected to an exhaust pipe, said extension having a port formed therein intermediate of its ends, a tubular housing detachably extending between said intermediate port and a secondary outlet port in the opposite end of said manifold, the end of said tube adjacent to said secondary port being open, an operable valve mounted in said manifold adjacent to said main outlet port which in one position closes said main outlet port and opens said intermediate port and in its other position opens said main outlet port and closes said intermediate port whereby exhaust gases from said compartment may flow directly therefrom to said exhaust pipe or may be deflected through said tubular housing before entering said exhaust pipe, a cap adapted to fit over the open end of said tubular housing, and a heat exchanger fixed in said cap and extending lengthwise through said tube, for the purpose described.

3. A device of the character described comprising, a manifold casting having an elongated exhaust compartment therein and having a plurality of inlet openings extending through one wall thereof to said compartment at spaced intervals therealong, said openings being aligned with and coacting with exhaust ports in an associated engine to receive exhaust gas from said engine, said manifold also having a main outlet port at one end thereof which communicates with one end of an exhaust chamber formed in an extension which is cast integrally with said manifold, the other end of said chamber being connected to an exhaust pipe, said extension having a port formed therein intermediate of its ends, a tubular housing detachably extending between said intermediate port and a secondary outlet port in the opposite end of said manifold, the end of said tube adjacent to said secondary port being open, an operable valve mounted in said manifold adjacent to said main outlet port which in one position closes said main outlet port and opens said intermediate port and in its other position opens said main outlet port and closes said intermediate port whereby exhaust gases from said compartment may flow directly therefrom to said exhaust pipe or may be deflected through said tubular housing before entering said exhaust pipe, a cap adapted to fit over the open end of said tubular housing, a heat exchanger fixed in said cap and extending lengthwise through said tube, and an inner tube extending within said housing tube and spaced therefrom, said inner tube being disposed around said heat exchanger and being secured to said extension member, for the purpose described.

4. A device, as claimed in claim 3, wherein the space between said tubes is filled with heat insulating material.

EDMUND E. HANS.